May 13, 1930. W. E. KERSHAW 1,758,522
CHARGE CUT-OFF FOR STORAGE BATTERIES
Filed Aug. 6, 1925

INVENTOR
William E. Kershaw
by
Augustus B Stoughton
ATTORNEY.

WITNESS:
Rob R. Litchel.

Patented May 13, 1930

1,758,522

UNITED STATES PATENT OFFICE

WILLIAM E. KERSHAW, OF GWYNEDD VALLEY, PENNSYLVANIA

CHARGE-CUT-OFF FOR STORAGE BATTERIES

Application filed August 6, 1925. Serial No. 48,528.

The present invention is based on the discovery that differentials of temperature exist or come about in the electrolyte at different levels or at different locations toward or at the completion of charge and, broadly stated, my invention is embodied in circuit control means including a differential thermostat immersible in, or closely adjacent to, the electrolyte and responsive to such differentials of temperature.

The invention also comprises the methods to be presently described and finally claimed.

In the following description reference will be made to the accompanying drawings forming part hereof and illustrative of apparatus useful in explaining the method itself and in those drawings—

Referring to the accompanying drawings, a cell container 1 is sectioned to show the inside of a cell, the level of the electrolyte above the plates 2, being indicated at 3. It will be observed that there is a space of some depth between the bottoms of the plates and the bottom of the container. This is generally spoken of as the sediment space, as its principal function has been to provide a receptacle for the particles of active material which have become detached from the plates. Only the electrolyte in the sediment space approximate to the bottoms of the plates takes any part in the actions of charge and discharge, the bulk of the electrolyte occupying the space below the plates being practically "dead". Even at the end of a charge given at high current rate there is little or no stirring action taking place in the main body of the electrolyte below the plates. Although the temperature of a cell tends to rise gradually during charge, there is no marked difference in temperature between the inactive electrolyte below and that above the level of the bottoms of the plates. When near the completion of charge gas is liberated freely from the surface of the plates. This occasions a stirring action of the whole upper portion of the electrolyte and at the same time a marked increase in the rate of heating occurs, so that within a short time after vigorous gassing commences, the whole upper part of the electrolyte is at a uniformly higher temperature than that in the bulk of the sediment space. This temperature difference at full charge, which may be three degrees C., more or less, seems to be uniformly reliable, and with any given type of cell in uniform assembly to be always approximately the same irrespective of the actual temperature of the cell and at all of the more common charging rates. Other differences such as changes in the relative gas content and in the relative specific gravity of different portions of the electrolyte also make their appearance at the same time.

Figure 1:
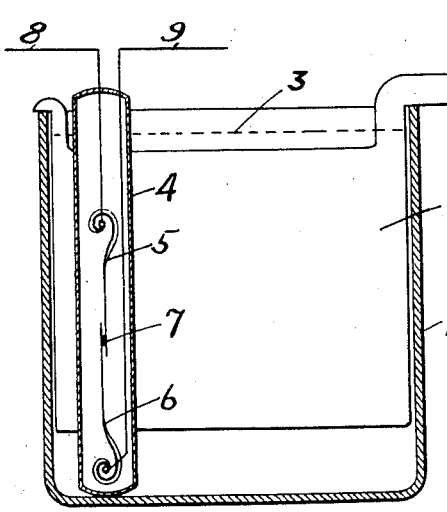
Figure 1 is a central sectional view illustrating features of the invention.

An example of the method of taking advantage of the relative temperature differences is shown diagrammatically in section in Fig. 1 of the drawings. It may be called a differential thermostat. It consists of a container or chamber 4 of suitable impervious, inert substances, such as glass, bakelite, hard rubber, alloy or metal acting as a protection to the differential device itself which consists of two ordinary thermostats 5 and 6, which may be of any substances capable of causing movement by their unequal thermal expansions. One end of each of these is fastened to the container 4 in any suitable manner and in such a way that their free ends 7 which carry electrical contact points are normally in contact with each other. As long as the two thermostats are at the same temperature, a change in this temperature will only cause the ends to move in the same direction and to the same extent and hence the electrical contact will remain unbroken, whereas if the thermostat 5 becomes heated more strongly than 6, as at the completion of charge, its free end will move a greater distance than that of the other and hence the contact will be broken.

Figure 2:
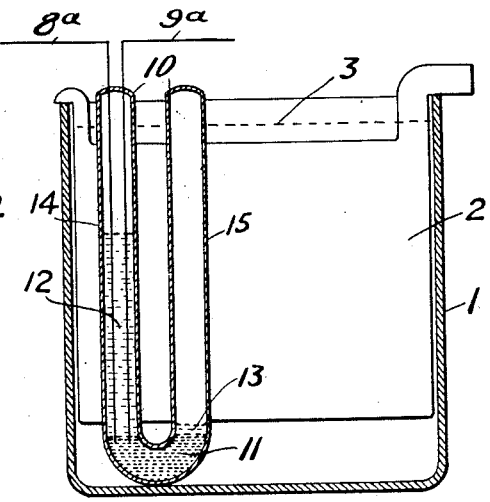
Fig. 2 is a similar view illustrating a modification.

5 and 6 in Fig. 1 may be assumed to be two expansion tubes of the general type used mainly in pressure gauges, often called Bourdon tubes, and containing a suitable gas, liquid or vapor capable by thermal expansion of causing movement of the free ends of the tubes. The path 8 and 9 for current, either charging current or relay current controlling the charging current, is completed or interrupted at the contacts 7. As another example a device shown diagrammatically in section in Fig. 2 may be referred to. This consists of a tube 10 of glass, or any other suitable substance and of the general U-shaped form indicated on the drawing and hermetically sealed at both ends. In the bottom of this tube rests some relatively heavy conducting liquid 11, as of mercury, into which dip the ends of the contact conductors $8^a$ and $9^a$. Above the liquid 11 is supported some lighter liquid 12 and 13 of a more or less volatile nature, such as ether, the surface of which is above the bottoms of the plates in one arm of the tube 14 and below the bottoms of the plates in the other arm of the tube 15. The spaces shown above the two surfaces of ether are filled with ether vapor and contain no appreciable air. As long as the temperatures of these two surfaces remain equal, the vapor pressures in the two spaces also remain equal irrespective to their actual temperature, and therefore there will be no tendency for any change of level in the two mercury surfaces. As soon, however, as the upper ether surface is brought to a higher temperature than that of the lower, as at the end of charge, a difference of vapor pressure in the two compartments will be established and this difference will be equalized by the motion of the mercury lowering its level in the arm 14 and raising it in the arm 15, thus causing the opening of the electrical circuit at the ends of the contact wires $8^a$ and $9^a$.

Figure 3:
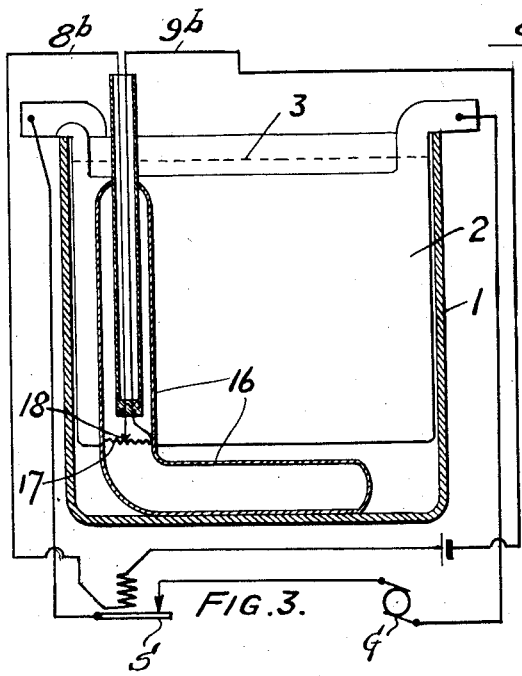
Fig. 3 is a similar view illustrating another modification and the circuit in which the device is used.

Another example of a device operative by differential temperatures is shown diagrammatically in section in Fig. 3. Figure 3 shows diagrammatically a circuit in which the device is used. Plates 2 are placed in one circuit with a charging source G and a relay switch S. The cutout device is in another circuit which contains the coil controlling the relay S. The wiring is arranged in such a manner that when the current is broken at 18 the coil releases the switch S and the charging circuit from the source of current G is broken. The device shown in this figure consists of a container 16 filled with air or a suitable gas and which is separated into two portions containing approximately equal volumes by a diaphragm 17 of thin corrugated metal or any other suitable flexible material and by means of which an electrical contact is normally made at 18 between the wires $8^b$ and $9^b$ by way of diaphragm 17. Equal changes of actual temperature occurring in both portions of the container will cause equal pressures on both sides of the diaphragm and will therefore occasion no movement. But when the part of the container which is above the bottoms of the plates is brought to a relatively higher temperature than that portion which lies below the bottoms of the plates the consequent expansion of the gas in the upper portion will tend to cause a movement of the diaphragm away from one of the wires $8^b$, thus breaking the electrical contact.

Figure 4:
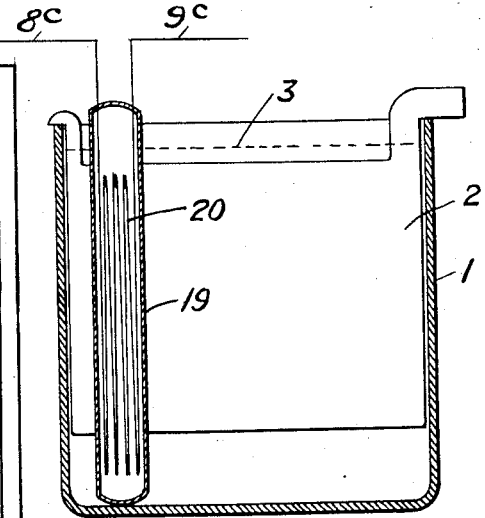
Fig. 4 is a similar view illustrating another modification.

A further example of a device for the application of the differential temperature method is shown diagrammatically in section in Fig. 4. It consists of a container 19 acting as a protective covering for a thermopile 20, consisting of any suitable number of thermo-couples connected in series and whose outgoing wires are shown at $8^c$ and $9^c$. As long as the upper and lower ends of the thermopile are at the same temperature, irrespective of what that actual temperature may be, there will be no difference of potential in the wires $8^c$ and $9^c$, but when the junctions of the thermo-couples, which are above the bottoms of the plates, become heated, as at the end of charge, to a higher relative temperature than that of the thermo-couple junctions which are below the bottoms of the plates, a difference of electrical potential will be set up between the wires $8^c$ and $9^c$, and this difference may be used for controlling the charging current which is passing through the cell.

It will be obvious to those skilled in the art that modifications may be made in details of construction, arrangement, procedure and mere matters of form without departing from the spirit of the invention which is not limited to such matters or otherwise than as the prior art and the appended claim may require.

I claim:

A storage battery including a container and electrolyte and plates arranged in the container above the bottom thereof, providing at the bottom of the container a region of quiescent electrolyte of comparatively stable temperature below a region of circulating electrolyte in which the temperature rises sharply towards the completion of battery charge, a thermal responsive device of which a part is located wholly in the region of circulating electrolyte and of which a part is located wholly in the region of quiescent electrolyte and a circuit adapted to be controlled by the thermal responsive device.

WILLIAM E. KERSHAW.